Jan. 13, 1959   W. H. HARBOR   2,868,446
ITEM COUNTER CONTROL MECHANISM FOR ACCOUNTING MACHINES
Filed Jan. 11, 1956   4 Sheets-Sheet 1

FIG. 1

INVENTOR
WILLIAM H. HARBOR
BY
HIS ATTORNEYS

Jan. 13, 1959 W. H. HARBOR 2,868,446
ITEM COUNTER CONTROL MECHANISM FOR ACCOUNTING MACHINES
Filed Jan. 11, 1956 4 Sheets-Sheet 2

FIG.2 FIG.3B

INVENTOR
WILLIAM H. HARBOR
BY
HIS ATTORNEYS

Jan. 13, 1959 W. H. HARBOR 2,868,446
ITEM COUNTER CONTROL MECHANISM FOR ACCOUNTING MACHINES
Filed Jan. 11, 1956 4 Sheets-Sheet 4

INVENTOR
WILLIAM H. HARBOR
BY *Earl Beust*
*Richard Van Buren*
HIS ATTORNEYS

United States Patent Office 2,868,446
Patented Jan. 13, 1959

2,868,446

ITEM COUNTER CONTROL MECHANISM FOR ACCOUNTING MACHINES

William H. Harbor, Edgware, England, assignor to The National Cash Register Company, Dayton, Ohio, a corporation of Maryland Application January 11, 1956, Serial No. 558,504

5 Claims. (Cl. 235—60)

The present invention relates to calculating and similar accounting machines and is more particularly directed to the automatic counting of certain items as they are transferred from one denominational order of a totalizer to the next higher order.

Machines of the type referred to above are provided with totalizers for the accumulation and storing of values set up on the amount keyboard, said totalizers in turn being provided with transfer mechanisms for transferring values from lower to higher denominations, as the lower order wheels exceed their capacity, and in so doing again arrive at zero.

In some accounting systems it is desirable that a record be kept of the number of times the capacity of a particular denomination of a totalizer has exceeded its capacity.

A typical example of such a use could be an accounting system in which account records of various customers are prepared on an accounting machine having a plurality of totalizers and in which the account or ledger cards are located in printing position around the platen roll of a traveling record material carriage, said carriage in turn being arranged to be selectively tabulated to different columnar positions in relation to a single set of printing elements. In a certain column of the ledger card, there may be printed, for example, items involving fractions such, for instance, as eighths.

In this particular system it may be unnecessary to print the fractions on the ledger cards, but where the system requires an accurate grand total of the printed items, as compared with an automatically accumulated grand total, comprising also the unprinted or non-printed eighths, it is essential to compute simultaneously the number of times that the fraction wheel of the grand totalizer has made a complete revolution, and in so doing has operated the transfer mechanism for the adjacent higher order to cause one unit to be entered therein. Such a condition could arise in a machine having a multiple totalizer selecting stop, in the columnar position of the traveling carriage, in which the items are printed. In this position, for instance, both a balance totalizer and a grand totalizer could be selected from a stop located on the traveling carriage in this particular columnar position.

If at the time of printing the item by taking a total from the balance totalizer, the printing mechanism for the fractional denominational order is disabled, the fractions would not print on the ledger card, but would, nevertheless, add into the fractional denominational order wheel of the grand totalizer. The continual entry of these fractions into the grand totalizer will naturally result in the transferring of units into the adjacent higher order totalizer wheel. Consequently, the grand totalizer at the end of a series of account posting runs will contain a total which exceeds the total of the amounts actually printed on the ledger cards, due to the addition of the fractions into the totalizer and the resulting transfers to the adjacent higher order.

Thus in order to arrive at the total of the printed items, as compared with the figure contained in the grand totalizer, it is necessary to provide a record of the number of times that the fraction wheel of said grand totalizer has exceeded its capacity, and as a result has transferred one unit to the adjacent higher order. The value represented by this number may then be deducted from the total in the grand totalizer to provide a net figure, which represents the total of the items actually printed upon the individual ledger cards.

For example, if the total in the grand totalizer is £100.3.9d. (100 pounds, 3 shillings, and 9 pence) and the number of times that the fraction or eighths totalizer wheel has transferred a whole unit to the units of pence wheel is 30, then the true net total of the amounts actually printed on the account cards will be £100.3.9d. minus 30 pence, or two shillings and six pence, which equals 100 pounds, one shilling, and three pence.

With the above brief outline in mind, it is therefore a general object of the present invention to provide means for automatically counting the number of times the fraction denomination of a totalizer exceeds its capacity and operates the transfer mechanism of the adjacent higher order to enter a whole unit therein.

Another object is the provision of means for controlling the actuation of an item counter.

A further object is to provide a control mechanism for an item counter, in which the item counter will be prepared for actuation during one machine operation and actuated during a following machine operation.

A still further object is the provision of an item counting mechanism which is controlled jointly by the engaging movement of a particular totalizer and the operation of the transfer mechanism in a certain denominational order of said particular totalizer.

With these and incidental objects in view, the invention includes certain novel features of construction and combinations of parts, a preferred form or embodiment of which is hereinafter described with reference to the drawings which accompany and form a part of this specification.

GENERAL DESCRIPTION

The present application is directed to improvements in machines of the general type fully disclosed in the United States Patent No. 2,626,749, issued January 27, 1953, to R. A. Christian et al., to which reference may be had for a full disclosure of mechanism not pertinent to the present invention, and which for that reason will only be described in a general way herein.

The machine includes a full complement of amount keys, and "motorized" control keys for conditioning ten add-subtract totalizers for adding, subtracting, total-taking, and sub-total-taking operations. The machine may also be released for operation by means of three motor bars which have dual modes of operation for the control of different machine functions.

A traveling record material carriage is provided having a back-feed record material platen and a front feed throat to receive front-fed record material, such as record cards.

Removable control stops may be mounted in desired columnar positions on the traveling record material carriage to control the selection of totalizers and the various functions which the machine is to perform, and said stops may also be adapted automatically to release the machine for operation, if desired.

The machine also incorporates an electric typewriter by means of which any descriptive data may be printed on the inserted documents.

Printing type members are settable under the control of the amount keys, the function control keys, and the electric typewriter, for the proper recording of relevant data on the inserted documents.

Three item counters are arranged at the right-hand side of the numeral keyboard, and may be selectively associated with certain of the totalizers for the counting of entries made therein. As will be fully explained later, one of these item counters is associated with a certain denominational order of a No. 4 totalizer, and entries of units into said item counter are subject to a dual control, being dependent first upon the operation of a tens transfer mechanism associated with said certain denominational order, and second upon the engaging movement of the said totalizer to receive a total taken from a No. 1 or balance totalizer.

By way of example only, another one of the item counters is tied to the above-mentioned item counter so as to simultaneously receive units entered into the latter. The particular item counter arranged to receive a unit each time the balance totalizer is cleared into the No. 4 totalizer is, in the present instance, the No. 2 item counter, and is manually resettable after each series of entries. The item counter which is tied thereto, and which is non-resettable, so as to accumulate a grand total of the units entered into the No. 2 item counter, is the No. 3 item counter.

In the present embodiment of the invention, the amount keyboard is adapted for British currency, and the denominational order of the No. 4 totalizer which controls the entry of units into the item counters is the fractions of pence denomination. However, the invention is obviously applicable to keyboards arranged for the decimal system, or any other desired system, and the tens transfer mechanism which controls the entry of units into the item counters need not necessarily be that associated with the lowest denominational order of the totalizer, but may be that associated with any other denominational order or orders, and any other item counter, or combination of item counters, may be arranged to receive the entered units, without departing in any way from the spirit of the invention.

The printing type member associated with the fractions of pence denomination is so controllable by the carriage stops that it does not print when individual entries are made on the customer's record, and added into the No. 4 totalizer by taking a total from the balance totalizer, but prints only when a total is finally taken from the No. 4 totalizer, which latter accumulates a grand total of all the individual entries made into the No. 1 totalizer. Thus it will be seen that although the fractions of pence, such as eighths, for example, do not print upon the customers' records, yet all such fractions are properly accumulated in the No. 4 totalizer, and are finally printed as a true grand total of all entries, when the total is eventually taken from the No. 4 totalizer.

*Keyboard, amount differentials, totalizers and traveling carriage*

The machine as disclosed herein has an amount keyboard which is arranged for British currency. However, this is not intended as a limitation, as the keyboard may easily be arranged for other types of currency systems, including the decimal system, as used in the United States, if desired.

The amount keyboard of the present machine includes one row of seven fractional pence keys 20 (Fig. 1), 11 pence keys 21, two rows of shilling keys 22, and several rows of pound keys 23. In addition, the amount keyboard includes four rows of date keys 24, including year, month, and day keys, located at the left-hand side of the amount keyboard. The amount keys 20 to 23 inclusive are of flexible construction in that the depression of one key in a particular row releases a key previously depressed in said row, and so on.

Each denominational order of amount keys 20 and 23 has associated therewith a differential actuator mechanism, including a horizontally positionable rack 25 (Fig. 2) having the usual graduated steps (not shown) on its forward end arranged to engage the lower ends of the stems of depressed amount keys to position said racks in accordance with the value of said depressed amount keys. Each amount rack is provided with a zero latch mechanism (not shown) for retaining said rack in zero position when no amount key is depressed, in the corresponding denominational order. Depressing an amount key releases the zero latch and frees the rack for positioning under influence of the depressed amount key. The rack 25 is operatively connected to a corresponding printing sector 32 (Fig. 1) which is positioned in accordance with the depressed amount key in adding and subtracting operations and in accordance with the corresponding wheel of the selected totalizer in total taking operations, whereupon operation of the printing mechanism near the end of machine operation, causes the value of the depressed amount key or the amount standing on the corresponding totalizer wheel to be printed upon record material supported by the platen roll of the traveling carriage. The rack 25 is connected by a link 26 (Fig. 2) to a corresponding auxiliary rack having upper and lower toothed portions which cooperate respectively with wheels 28 of the corresponding denominational orders of ten totalizers, including a No. 1 or balance totalizer, often referred to as a crossfooter, eight add-subtract totalizers numbered 2 to 9 inclusive, and an X or overdraft totalizer, which is used in transposing complementary amounts to positive amounts for the proper recording of the true negative balance or overdraft upon the record material supported by the traveling carriage.

In adding and subtracting operations the wheels 28 of the selected totalizer or totalizers, as the case may be, are engaged with and disengaged from the auxiliary racks 27 in proper timing to cause the amount set up on the amount keys to be entered in said wheels. In total taking operations no amount keys are depressed and the zero latches are released automatically at the beginning of machine operation. The wheels 28 of the selected totalizer are engaged with and disengaged from the auxiliary racks in proper timing to permit said wheels to position said racks and the corresponding printing sectors 32 in accordance with the amount standing on said wheels.

The auxiliary actuator rack 27 (Fig. 2) has a series of openings therein which coact with slotted portions in a series of bars, said bars in turn being supported by the machine framework and in turn supporting the auxiliary actuators for horizontal shifting movement.

Inasmuch as all of the amount banks and their associated differential mechanisms are similar in construction, and are fully disclosed in the U. S. Patent No. 2,626,749, it is believed that the above brief description of said mechanisms will be sufficient for the present purpose.

As explained in a general way above, the present machine is provided with a horizontally shiftable traveling carriage 30 (Fig. 1), mounted for such movement by means of parallel rails supported thereby, in cooperation with rollers (not shown) in turn mounted on the machine framework. The traveling carriage 30 supports a rotatable platen roll 31, which in cooperation with pressure rollers and a front feed guide chute supports record material either inserted at the back thereof and wound around said platen roll, or inserted at the front thereof, for adjusting and locating said record material in relation to the printing mechanism to receive records imprinted thereon by said printing mechanism.

In addition to the printing sectors 32 (Fig. 1), which are positioned under control of the amount keys, as explained before, in adding and subtracting operations, and under control of the selected totalizer wheels in total-taking operations, the present machine is provided with a typewriter attachment, including a full complement of typewriter keys 33, for use in typing data of a descriptive or other nature upon the record material supported by the traveling carriage. The various totalizers may be selected for engagement with the amount actuators, and conditioned for the desired function by means of a series of totalizer control keys 29 (Fig. 1) located immediately to the left of the amount and date keyboard, or by means of a series of control stops 34 adjustably mounted on a bar 35, removably connected to the front of the traveling carriage 30, in predetermined positions corresponding to columnar divisions of the record material used in the particular business system. The control stops 34 carry mutilated control plates (not shown) arranged in proper order to select the desired totalizers for the desired functions with regard to predetermined columnar positions of the traveling carriage 30.

The amount keys 21, 22 and 23 and the control keys 29 are automatically released near the end of machine operation; however, said keys may be manually released prior to machine operation by depression of a Release key 36, located adjacent to said control keys 29.

Operating mechanism

The mechanism of the machine is driven by means of a conventional type of electric motor, not shown, but fully disclosed in the Christian Patent No. 2,626,749, which runs continuously when the machine is being used, and is controlled by an On-and-Off switch 37 (Fig. 1), located immediately to the left of the typewriter keys 33. Operation of the machine may be initiated by means of a Main release bar 38, located immediately to the right of the amount keys 20, or by means of auxiliary release bars 39 and 40. The release bar 38, in addition to initiating machine operation, may also be arranged to cause the traveling carriage to tabulate from one columnar position to the next, or to control the line-spacing movement of said traveling carriage. Likewise the auxiliary bar 39, in addition to releasing the machine for operation, may also be arranged to cause the platen roll to be rotated, to line-space the record material supported thereby, and the auxiliary bar 40, in addition to releasing the machine for operation, may also be arranged to cause the traveling carriage to skip-tabulate from one columnar position through several intervening columnar positions to a predetermined columnar position. In addition to the release bars referred to above, the machine may be automatically released for operation by means of the control stops 34 (Fig. 1) in preselected columnar positions of the traveling carriage 30.

The tabulating functions of the traveling carriage, in both forward and return directions, may be controlled manually by means of the usual control keys provided both on the adding machine keyboard and on the typewriter keyboard, as disclosed in the Christian patent referred to above, or automatically through the medium of the control stops 34 in pre-selected columnar positions of the carriage. Likewise the opening and closing of the front feed guide chute or throat, and the operation of the line-spacing mechanism to feed the record material, may be controlled manually by means of control keys, or automatically by means of control stops 34 in pre-selected columnar positions of the traveling carriage.

Totalizer functions

In adding operations, after the main rack 25 (Figs. 1 and 2) and its associated auxiliary rack 27 have been positioned under influence of the depressed amount keys 20 to 23, the corresponding wheel of the selected totalizer or totalizers are engaged with the auxiliary rack 27 and return movement forwardly of said auxiliary rack and its companion main rack 25, during the latter part of machine operation, rotates the totalizer wheels in an additive direction, in accordance with the positioning of the actuator racks by the depressed key, to enter in said totalizer the value of said key.

In subtract operations, the corresponding wheel of the selected totalizer is engaged with the auxiliary actuator 27 (Fig. 2) prior to its initial movement, which movement rotates said wheel in a reverse direction to subtract therefrom the value of the depressed amount key. In total-taking operations, comprising both sub-total and total operations, the corresponding wheel 28 of the selected totalizer is engaged with the auxiliary actuator 27 prior to its initial movement, which movement rotates said wheel in a reverse direction from its preset position to its zero position, which is determined by one of two diametrically opposed teeth on a tripping cam 42 (Fig. 2), carried by said totalizer wheel 28, coming into contact with a corresponding add-transfer trip pawl 43, to zeroize said totalizer wheel and to position the auxiliary actuator 27, the main actuator 25, and the corresponding printing sector 32 (Fig. 1) in accordance with the value standing on said totalizer wheel. In total operations the selected totalizer wheel is disengaged from the auxiliary actuator 27 after being zeroized, and thus remains in a zeroized condition. In sub-total operations the selected totalizer wheel remains in engagement with the auxiliary actuator 27 during its return movement forwardly, which restores said wheel to its original condition to reenter therein the amount originally stored in said wheel.

Tens transfer mechanism

The usual tens transfer mechanism, fully disclosed in the above mentioned Christian patent, is provided for transferring tens digits from lower to higher denominations in adding and subtracting operations, and it is therefore believed that a brief description of said mechanism herein will be sufficient for the present purpose.

As an example of the tens transfer mechanism, the mechanism used for transferring tens digits from the fractional pence bank 20 (Fig. 1) to the pence bank 21, will be described.

Figure 2:
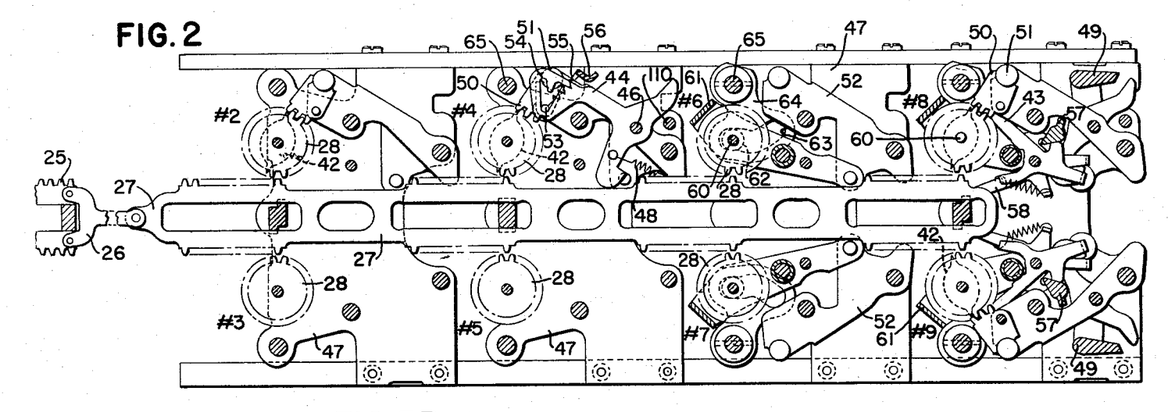
Fig. 2 is a sectional view, as observed from the right, taken through certain of the totalizers of the machine.

Referring to Fig. 2, if the wheel 28 for the fractional pence denomination 20 passes from 7 to zero while traveling in an additive direction, one of the diametrically opposed teeth of the tripping cam 42 thereof engages the tooth of the add tripping pawl 43 to rock said pawl clockwise to release a corresponding tripping lever 44, free on a stationary stud 46 secured in a totalizer framework 47, to the action of a spring 48, which immediately rocks said lever a slight distance counter-clockwise until an upward extension thereof contacts a transfer restoring bar 49. The above described slight movement of the lever 44 prevents the add pawl 43 from reengaging said lever when the tooth of the tripping cam 42 moves beyond said pawl.

After the main and auxiliary actuators 25 and 27 (Fig. 2) have completed their return movement forwardly, the teeth of the wheels 28 are disengaged from said auxiliary actuators and are simultaneously engaged with the teeth of corresponding transfer segments 50, one of which is provided for each denominational order. The transfer segments 50 are pivotally mounted on corresponding studs 51 in corresponding plates 52 supported by the framework 47. The segments 50 each carries a stud 53, which engages a Y-shaped camming slot 54 in the corresponding transfer tripping lever 44.

After the lower order or fractional pence totalizer wheel 28 has been disengaged from the auxiliary actuator rack 27, the transfer restoring bar 49 (Fig. 2) is released, in the manner explained in the above mentioned Christian patent, and moves under spring action toward the left (Fig. 2), permitting the corresponding tripping lever 44 to complete its counter-clockwise movement in unison therewith. During counter-clockwise movement of the lever 44, a spring 55, tensioned between the stud 53 and the bail of a rockable yoke 56, guides said stud into the right-hand or rearward branch of the Y-shaped slot 54. This rocks the corresponding segment 50 counter-clockwise to advance the next higher order or pence wheel 28 one tooth space in an additive direction to effect the transfer of a digit from the fractional pence denomination to the pence denomination. The bar 49 subsequently restores the lever 44 to untripped position.

In the very beginning of subtract operations, a transfer pawl shifting bar 57 is rocked counter-clockwise (Fig. 2) to move the add tripping pawl 43 out of cooperative relationship with the teeth of the tripping cam 42, and to simultaneously move a subtract tripping pawl 58 into cooperating relationship with the teeth of said cam. Simultaneously with the rocking of the bar 57, the yoke 56 is rocked counter-clockwise, to shift the position of the upper end of the spring 55, in relation to the slot 54, so that said spring will lead the stud 53 into the left-hand or forward branch of the said slot 54 when the transfer lever 44 functions in subtract operations, as will be explained presently.

In subtract operations, as explained before, the fractional pence wheel 28 is engaged with the auxiliary actuator rack 27 prior to its initial movement, which movement rotates said wheel in a reverse or subtractive direction, to enter therein an amount equal to the value of the depressed fractional pence key 20. If the wheel 28 passes from zero to 7 while being rotated in a subtractive direction, one of the diametrically opposed teeth on its tripping cam 42 engages the corresponding pawl 58 and rocks said pawl counter-clockwise to release the fractional pence transfer lever 44, which has previously been restored to untripped position. After the auxiliary actuator rack 27 has completed its initial movement rearwardly, the fractional pence wheel 28 is rocked out of engagement therewith and into engagement with the corresponding transfer segment 50, after which the transfer restoring bar 49 is released to spring action to permit the transfer lever 44 to move counter-clockwise in unison therewith. During counterclockwise movement of the transfer lever 44, the spring 55, which is now in its left-hand position (Fig. 2), guides the stud 53 into the left-hand branch of the slot 54 to cause said slot to rock the segment 50 for the adjacent higher order wheel 28 clockwise to move said wheel one step in a subtractive direction to effect a tens transfer.

If the immediately succeeding operation is other than a subtract operation, the bar 57 and the yoke 56 will be returned clockwise to the positions shown in Fig. 2, to move the subtract pawls 58 to ineffective position and to simultaneously move the adding pawls 43 to effective position, and to position the springs 55 so that they will guide the studs 53 into the right-hand branches of the Y-shaped slots 54.

The wheels 28 (Fig. 2) of each totalizer are rotatably supported on a corresponding shaft 60, mounted in a framework 61 which is rockable to engage and disengage the corresponding totalizer wheels with and from the auxiliary actuators 27. Each shaft 60 carries at each end thereof rollers 62, which engage cam slots 63 in totalizer engaging and disengaging cams 64, secured on opposite ends of an engaging shaft 65, mounted in the totalizer framework.

Totalizer engaging mechanism (not shown) operating selectively under influence of the control keys 29 (Fig. 1) and under control of the control stops 34, in predetermined columnar positions of the traveling carriage, control the timing of the engaging and disengaging movements of the shaft 65 and the cams 64 to cause the wheels 28 of the corresponding totalizer to be engaged with and disengaged from the corresponding rack teeth in the auxiliary actuators 27, in proper timing for the type of operation being performed.

Item counters

Figure 1:
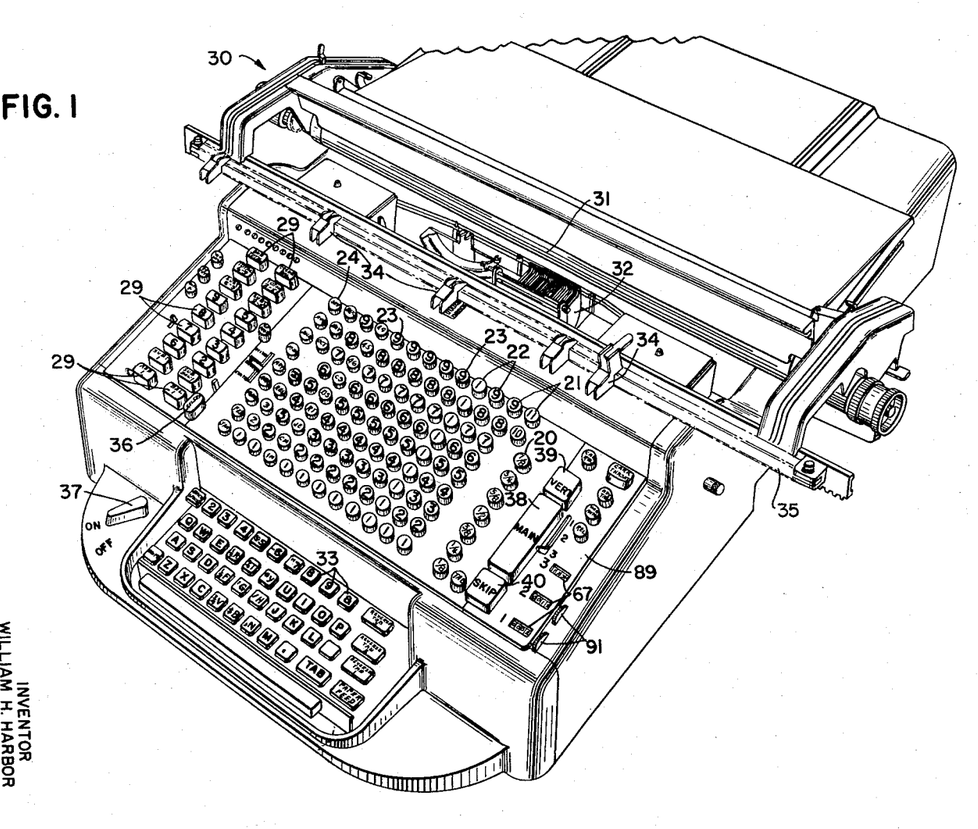
Fig. 1 is a perspective view of the entire machine.
Figures 3A, 4, 5, 6:
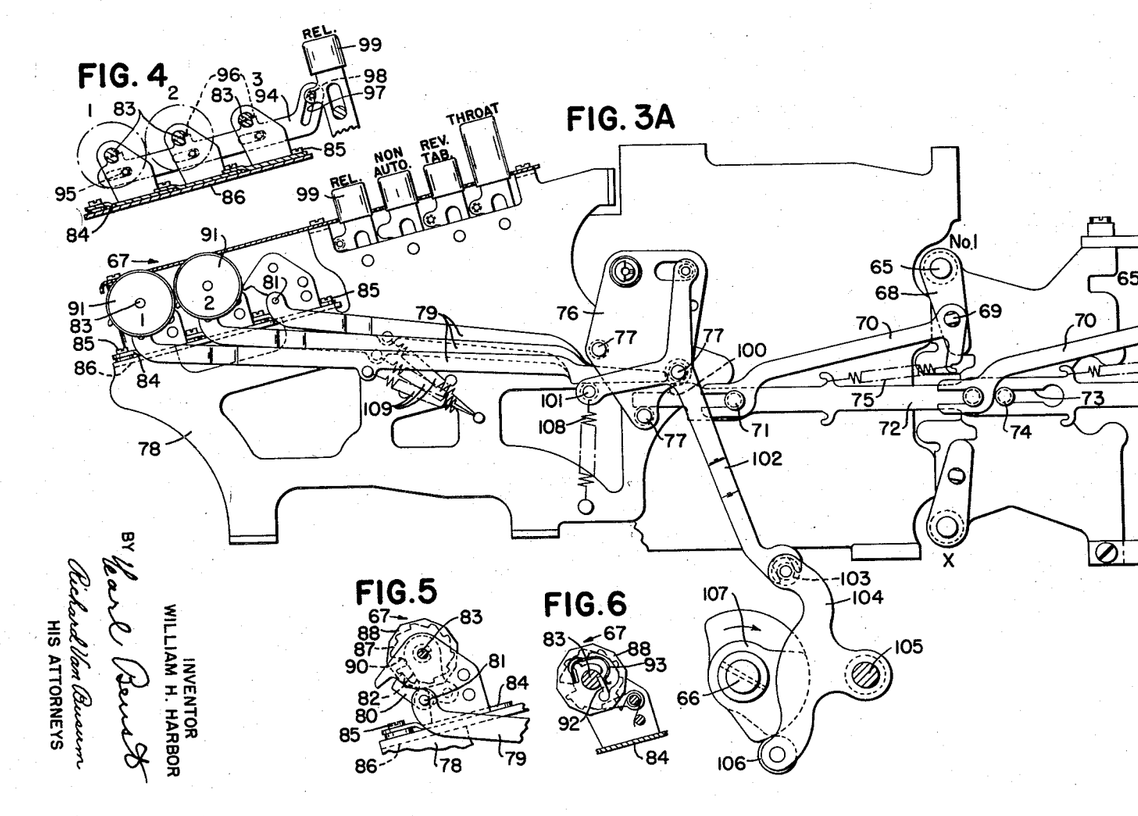
Figs. 3A and 3B together constitute a right side view of the item counting mechanism.
Fig. 4 is a fragmentary view showing certain details of construction of the item counters and the control over the resetting thereof by a release key.
Figs. 5 and 6 are detail views of portions of the item counters.

As shown in Figs. 1 and 3A, and as mentioned before, the present machine is provided with three item counters 67, numbered 1, 2 and 3, beginning with the lowermost counter, said counters being located just to the right of the machine release bars. The item counters may be used for counting certain types of operations performed in any one or more of the totalizers of the machine, and in the present adaptation, the No. 2 and No. 3 counters are used for counting each digit as it is transferred from the fractional pence denomination to the pence denomination. The No. 2 item counter is resettable so that it may be used for counting the number of pence transferred from the fractional denomination to the units denomination during any particular business period or series of account posting operations, and the No. 3 item counter is non-resettable so that it may be used to keep a running or grand total of all the pence transferred from the fractional pence denomination to the pence denomination.

Figure 3B:
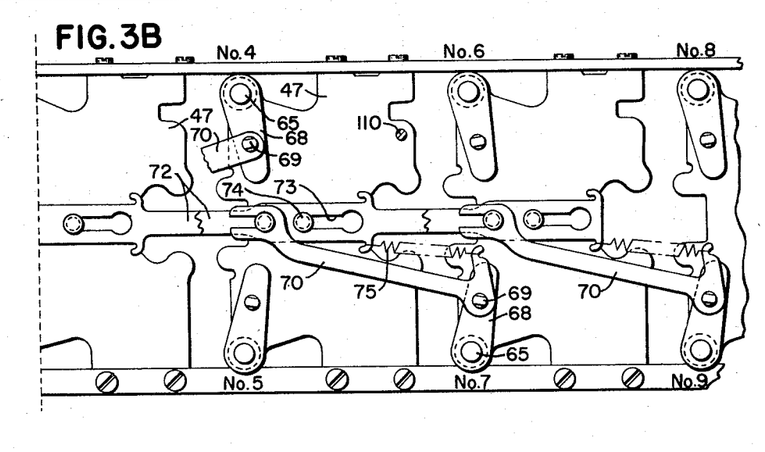

As shown in Figs. 3A and 3B, each of the totalizer engaging shafts 65 normally has secured on its right-hand end an arm 68, carrying a long stud 69, pivotally supporting the rear end of a corresponding link 70. The forward end of each of the links 70 is bifurcated to engage a corresponding headed stud 71, secured to one of three actuating slides 72. Each of the slides 72 is slotted as at 73, to slidably engage studs 74, secured in the machine framework. Each slide 72 is resiliently urged toward the rear of the machine by springs 75, stretched between said slides and corresponding spring hooks formed on each of the links 70. The forward ends of the slides 72 are guided between a plurality of separator plates 76, supported by studs 77 fast in a vertical bracket 78, said plates also serving to guide the rear ends of three pitmans 79, which are pivotally connected at their forward ends to corresponding studs 81 (Fig. 5) extending between companion side arms 82, each stud 81 also turnably supporting a corresponding item counter feed pawl 80. The companion arms 82 are freely mounted on a corresponding counter wheel support shaft 83 supported by the parallel side members of a corresponding counter frame 84 secured by screws 85 to a flange 86 of the bracket 78. The feeding teeth of each pawl 80 cooperate with the teeth of a corresponding ratchet 87 secured to the left-hand face of a numeral wheel 88. Each numeral wheel 88 has imprinted thereon the numerals zero to 9 inclusive, which may be viewed through side openings provided in a keyboard cover plate 89, as shown in Fig. 1. The item counters are of the deep notch and graduated tooth transfer type, and accordingly, each of the ratchets 87 is provided with a deep notch 90, coacting with the teeth of the pawl 80 for effecting the transfer of a unit to the next higher order wheel, in a manner well known in the art, each time its associated numeral wheel passes from 9 to zero.

Figures 7, 8:
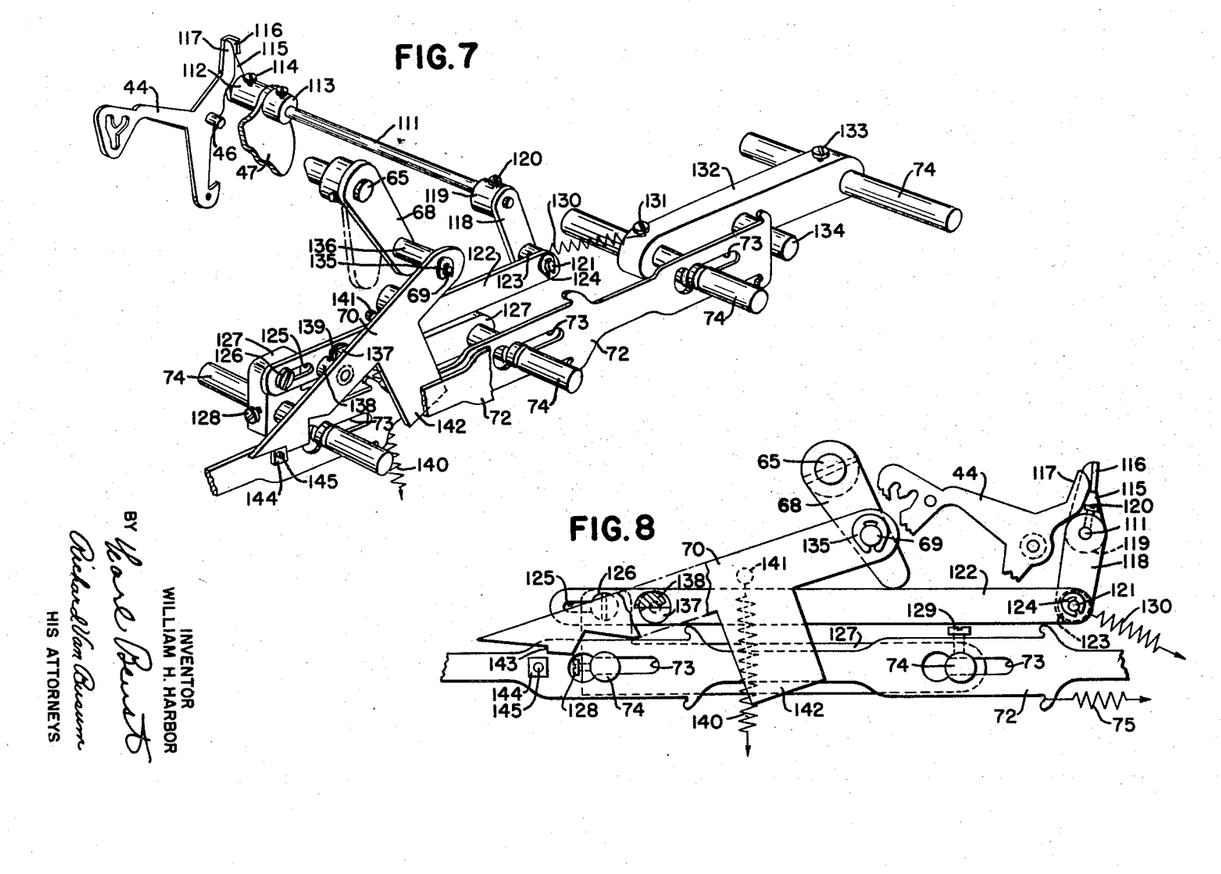
Fig. 7 is a perspective view of the actuating mechanism for certain of the item counters, after said mechanism has been prepared for actuation by the occurrence of a fraction transfer.
Fig. 8 is a side view of the mechanism shown in Fig. 7 in its normal or home position.

If a more detailed description of the above type of step-by-step counter is desired, reference may be had to Figs. 5 to 7 inclusive, and Figs. 16 to 22 inclusive, and the description in connection therewith in the United States Patent No. 788,453, issued April 25, 1905, to Joseph P. Cleal et al.

Secured on the right-hand ends of the No. 1 and No. 2 countershafts 83 (Fig. 3A) is a reset knob 91, which is accessible through a corresponding opening in the right-hand edge of the machine case (Fig. 1) for use in resetting the No. 1 and No. 2 item counter wheels to zero whenever necessary or desirable. As shown in Fig. 6, each numeral wheel 88 for the No. 1 and No. 2 item counters carries a pawl 92, which is arranged to be engaged by a notch cut in the corresponding shaft 83, when the latter is rotated clockwise by use of the corresponding reset knob 91, thereby causing the wheels of said item counters to be picked up and turned to their zero positions. The pawls 92 are urged into engagement with the corresponding shaft 83 by means of springs 93 lying within recesses provided in the numeral wheels.

Accidental or inadvertent resetting of the No. 1 and No. 2 item counters by unintentional operation of the reset knobs 91, is prevented by a locking slide 94 (Fig. 4) having slots which slidably engage studs 95 secured to the side walls of the counter frame 84. The upper edge of the slide 94 is provided with a series of abutment faces 96, which are arranged to normally engage with notches cut approximately half-way through each of the shafts 83, as illustrated in Fig. 4, and thereby prevent said shafts from being rotated so long as the slide 94 is in its forward position, as shown here. An upward extension of the slide 94 has an inclined slot 97 engaged by a stud 98, secured in the stem of a release key 99, depressibly mounted in the machine framework and spring-urged upwardly to its normal undepressed position, as here shown. Depressing the release key 99 moves the slide 94 rearwardly to in turn move the abutment faces thereon out of engagement with the notches in the shafts 83, so that said shafts for the No. 1 and No. 2 item counters may be rotated by use of their corresponding reset knobs 91, to reset the wheels of said item counters. Releasing pressure on the key 99 permits it to be spring-returned upwardly and thus to restore the slide 94 forwardly to its normal position, in which the abutment faces thereon again engage the notches in the shafts 83 to lock said shafts against rotation.

The forward ends of the slides 72 (Fig. 3A) are provided with shoulders 100, arranged to engage with the rear ends of the pitmans 79 for the purpose of operating the Nos. 1, 2 and 3 item counters. The rear end of each of the pitmans 79 is normally held out of the path of the corresponding slide 72 by means of a stud 101, which supports the rear ends of said pitman 79, said stud being mounted in a forwardly extending arm of a lever 102, pivotally mounted on one of the studs 77. The lever 102 has a downwardly extending arm slotted on its lower end to receive a stud 103 secured in the upper end of a cam follower arm 104 pivoted on a shaft 105 supported by the machine framework. The arm 104 is provided with a roller 106, which is urged into yielding contact with the periphery of a plate cam 107 by a spring 108 stretched between the stud 101 and a stud in the bracket 78. The cam 107 is secured on a main cam shaft 66 journaled in the machine framework and connected by a gearing and a clutch device to the operating motor which drives said main cam shaft 66 one complete clockwise revolution for each machine operation.

The high portion of the cam 107 holds the stud 101 in its elevated position (Fig. 3A) during the greater part of the first half-cycle of machine operation so as to hold the pitmans 79 out of engagement with the slides 72 during the time that the selected totalizers are engaged with the auxiliary actuators 27, in total, sub-total and subtract operations. During the last half-cycle of machine operation the lower portion of the periphery of the cam 107 moves beneath the roller 106 to permit the spring 108 to rock the lever 102 counter-clockwise to shift the stud 101 downwardly, and thus permit the springs 109 to move the pitmans 79 downwardly into engagement with the corresponding slides 72. Therefore, if the No. 1 totalizer, for example, has been selected and conditioned for addition in the present machine operation, its link 70 will move the corresponding slide 72 forwardly against the urgency of the spring 75, and thus cause the shoulder 100 to engage the rear end of the pitman 79 for the related counter 67, and thereby cause the pawl 80 to advance the units wheels of said counter one step to provide a count of the adding operations performed in the No. 1 totalizer.

*Control of No. 2 and No. 3 item counters*

As previously explained in the present embodiment, the No. 2 and No. 3 item counters have been modified for control by the No. 4 totalizer, whereby the transferring of a digit from the fractions of pence denomination of said totalizer to the pence denomination, causes both of said counters to be actuated upon the next succeeding add-engaging movement of the No. 4 totalizer, as will now be described.

In the machine chosen to illustrate the present invention, the No. 4 totalizer has been provided with an overdraft shaft 110 (Figs. 2 and 3B) which is rotatably supported in the totalizer side frames 47 and which has been split into two axially alined sections so that the right-hand section thereof forms an independent shaft 111 (Figs. 7 and 8) which is freely mounted in said frames 47 by means of collars, such as 112 and 113, secured to said shaft 111 by screws 114, said collars also preventing any lateral displacement of said shaft 111. Rigidly secured to the collar 112 is an arm 115 having an offset lug 116 arranged to cooperate with the rear surface of an upwardly extending arm 117 of the tripping lever 44, which is operated by the tripping cam 42 (Fig. 2) associated with the fractional pence wheel 28 for the No. 4 totalizer, when said wheel passes from 7/8 to zero.

A downwardly extending arm 118 (Figs. 7 and 8) is secured to the extreme right-hand end of the shaft 111 by an integral collar 119 and a screw 120. A stud 121 secured in the lower end of the arm 118 has pivotally connected thereto one end of a link 122, properly spaced from said arm by a collar 123, and held in place on said stud 121 by a spring clip 124, which engages in an annular groove in said stud 121.

A slot 125 in the forward end of the link 122 slidably supports said link on a screw stud 126 secured in a bracket 127 fastened to one of the studs 74 by a screw 128. The rear end of the bracket 127 is secured to another one of the studs 74 by a screw 129 (Fig. 8). The link 122, arm 118, shaft 111, and arm 115, are normally maintained, by the arm 117, in the position shown in Fig. 8, with the rearward end of the slot 125 engaging the screw 126 against the influence of a spring 130 secured at its forward end to the stud 121 and at its rearward end to a screw 131, which also secures a bracket 132 to one of the studs 74. The bracket 132 is secured to another one of the studs 74 by a screw 133, said bracket also having secured therein a stud 134.

The link 70 (Figs. 3A and 3B) which is pivoted to the arm 68 for the No. 4 totalizer, has been modified in form, as shown in Figs. 7 and 8, so as to comprise driving member pivotally retained on the stud 69 by a spring clip 135 engaging in an annular groove in said stud. A collar 136 free on the stud 69 properly spaces the lever 70 from the arm 68. Secured near the forward end of the link 122 is a half-round stud 137 which in the normal position of the parts, as shown in Fig. 8, underlies a similar half-round stud 138 secured in the lever 70, said studs 137 and 138 having chamfered edges, as indicated at 139 (Fig. 7) to facilitate their relocation after a separating movement, as will be explained presently. A spring 140 anchored to a stud 141 in the member 70, and to another stud (not shown) tends to rotate said member 70 counter-clockwise about its pivot stud 69. A downward extension 142, formed on the member 70, is located between the actuating slide 72 for the No. 3 item counter, and the actuating slide 72 for the No. 2 item counter so as to prevent any lateral movement of the lever 70 and to guide the latter in its forward and backward movements, as will also be explained presently. When the studs 137 and 138 are in their alined positions, as shown in Fig. 8, a shoulder 143 on the lower forward edge of the lever 70 is held upwardly out of the path of a square stud 144, secured in the actuating slide 72 for the No. 3 item counter, against the urgency of the spring 140. A round tenon 145 on the outer end of the square stud 144 is received within a corresponding aperture (not shown) in the actuating slide 72, for the No. 2 item counter, so that when the link 70 for the No. 3 item counter is actuated, the slides 72 for the No. 2 and No. 3 item counters will be actuated in unison therewith.

As has been previously described, no resetting knob 91 has been provided for the No. 3 item counter (Fig. 1) so that it is impossible to reset the No. 3 item counter after a series of entries, even though it is possible to reset the No. 2 item counter after such a series of entries, and thus the No. 3 item counter will continue to accumulate a grand or running total of all the units entered into the No. 2 item counter. The reason for this is that the number in the No. 3 item counter is intended to be used as a check against the number contained in the No. 2 item counter, at the end of each series of accounting postings or business period. This is essential since the No. 2 item counter may accidentally or otherwise be reset or partially reset during the progress of the postings of a particular service.

At the beginning of each series of account entries or business period, the operator employs the keys 33 (Fig. 1) of the typewriter for typing the number contained in the No. 3 item counter on a proof sheet (not shown), which is fed around the platen roll 31 from the back thereof, and also types the word "nil" on said sheet in respect of the number contained in the No. 2 item counter, if in fact the latter item counter is then standing at zero. At the end of the series of postings, the operator then types the new figures appearing in both No. 2 and No. 3 item counters, after which the number standing in the No. 2 item counter is mentally added to the number previously typed from the No. 3 item counter, which should provide a number that agrees with the new number now standing on the No. 3 item counter. The operation of the item counting mechanism is as follows:

If when a total is taken from the No. 1 totalizer and transmitted additively to the No. 4 totalizer, the value in the fractional or lowest denominational order of said totalizer is sufficient to cause a transfer to take place from the fractional pence wheel 28 to the units pence wheel 28 (Fig. 2), the corresponding tripping lever 44 will be rocked slightly in a counter-clockwise direction, as explained earlier. The upper arm 117 of the tripping lever 44 (Figs. 7 and 8) will move away from the lug 116 on the arm 115, permitting the tensioned spring 130 to rock the arm 118 counter-clockwise, thus imparting a similar movement to the arm 115 and the shaft 111 until said arm 115 is arrested by the lug 116 again contacting the upper arm 117. As a consequence, the link 122 will be drawn rearwardly a short distance, but not sufficiently to remove the stud 137 completely from beneath the stud 138, and therefore the shoulder 143 on the member 70 will continue to remain out of engagement with the square stud 144, as shown in Fig. 8.

The tripping lever 44 is now permitted to complete its counter-clockwise movement in unison with the bar 49 (Fig. 2) as previously explained, near the end of machine operation, whereupon the spring 130 (Figs. 7 and 8) moves the link 122 fully to the rear so that the stud 137 will pass completely from beneath the stud 138, and under influence of the spring 140, the member 70 will be rocked counter-clockwise about the stud 69, so that the shoulder 143 will engage the square stud 144, as shown in Fig. 7. Since this engagement occurs near the end of the machine operation in which the total is taken from the No. 1 totalizer, and after the wheels 28 of the No. 4 totalizer have been disengaged from the auxiliary actuators 27 (Fig. 2), no actuating movement will be imparted to the item counter actuating links 70 (Figs. 3A, 3B, 7 and 8) for the item counters Nos. 2 and 3, at this time.

During all subsequent machine operations relating to the particular account card being posted, and as long as the No. 4 totalizer remains in disengaged position, the item counter actuating mechanism will remain in the position shown in Fig. 7, without any actuating being imparted to item counters Nos. 2 and 3, thus permitting the posting in connection with a particular account to be completed without disturbing the preparation of the item counter actuating mechanism.

At the end of the posting operation, the account card for the account being posted is removed from the traveling carriage and the account card for the next account to be posted is inserted in said traveling carriage and arranged in printing position. When, during the process of posting this latter account, a total is taken from the No. 1 totalizer and printed on the account card, totalizer No. 4 will receive engaging movement to engage the wheels thereof with the auxiliary actuators, thus causing a clockwise movement, as viewed in Figs. 3B and 7, of its arm 68 from the full-line position to the position shown in dot and dash lines in Fig. 7. As the arm 68 moves clockwise the stud 69 will drive the member 70 forwardly so that through the cooperation of the shoulder 143 with the stud 144, the actuating links 72 for the No. 2 and No. 3 item counters (Figs. 3A, 3B, 7 and 8) will simultaneously be driven forward until the right-hand ends of the slots 73 contact the studs 74. Since the cam 107 (Fig. 3A) has at this time permitted the spring 108 to pull the stud 101 downwardly so that the pitmans 79 are alined with their corresponding actuating slides 72, said pitmans 79 for the No. 2 and No. 3 item counters will be driven forwardly to cause the corresponding pawls 80 (Fig. 5) to actuate the related ratchets 87 and item wheels 88 to enter one unit into each of said item counters.

Subsequently to the actuation of the slides 72 (Figs. 7 and 8) by the member 70, the transfer bar 49 (Fig. 2) restores the tripping lever 44 for the No. 4 totalizer clockwise, whereupon the upper arm 117 of said lever 44 rocks the arm 115, shaft 111, and arm 118 clockwise to shift the link 122 toward the left or forwardly from the position shown in Fig. 7 to a position in which the chamfer 139 on the stud 137 is near the corresponding chamfer 139 on the stud 138. In this stage of the operation, the wheels of the No. 4 totalizer are disengaged from the auxiliary actuators 27 (Fig. 2) permitting the arm 68 (Figs. 3B, 7 and 8) to move counterclockwise to shift the member 70 rearwardly or toward the right. Rearward movement of the member 70 causes the flat surface on the stud 138 therein to ride over the corresponding flat surface on the stud 137 in the link 122, to rock said member clockwise to the position shown in Fig. 8. Clockwise movement of the member 70 removes the shoulder 143 from engagement with the square stud 144, whereupon the springs 75 (Figs. 3B and 8) restore the actuating slides 72 for the No. 2 and No. 3 item counters rearwardly until the rear ends of said slides abut against the limiting stud 134 (Fig. 7). The cam 107 (Fig. 3A) now raises the stud 101, thus restoring the actuated pitman 79 out of the path of associated slides 72. The item counter actuating mechanism is now in the position shown in Fig. 8, in which it is ready to be conditioned to cause a further entry of one unit into the No. 2 and No. 3 item counters should a further transfer be made from the fractional pence denomination of the No. 4 totalizer to the units of pence denomination.

If for any reason it would be necessary to ascertain whether or not the No. 2 and No. 3 items counters contain or include all of the digits transferred from the fractional pence denomination to the pence denomination, a sub-total operation in the No. 4 totalizer may be manually initiated by use of the proper ones of the control keys 29 (Fig. 1) to cause operation of the engaging shaft 65 for the No. 4 totalizer, which operation would cause the link 70 to operate the slides 72 in case the tens transfer mechanism for the fractional pence denomination had been tripped in the preceding posting transaction.

If deemed necessary, it is entirely feasible that such a sub-total operation in the No. 4 totalizer could be performed at the beginning and at the end of each series of account postings or business periods, to insure that the No. 2 and No. 3 item counters contain all of the tens digits transferred from the fractional pence denomination to the pence denomination.

It is believed that a full understanding of the operation of the automatic item counting mechanism will have been obtained from a perusal of the preceding description, and that further description of operation will be unnecessary.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope and spirit of the invention.

What is claimed is:

1. In a machine of the class described, having a totalizer, including an element for each denominational order, and means to transfer tens digits from each denominational element to the adjacent denominational element, the combination of means including an actuator for each denominational element to enter values in said elements; means to engage and disengage the totalizer elements with and from the actuators for actuation thereby; an increment counting device; and means rendered effective by the tens transfer means for one denominational element, and operated by the engaging and disengaging means in a subsequent machine operation to advance the counting device one increment to count the number of tens digits transferred from said one denominational element.

2. In a machine of the class described, having a totalizer comprising an element for each denominational order, and means to transfer tens digits from each of said denominational elements to the next demnominational element, the combination of means including an actuator for each denominational element to enter values therein; means to engage and disengage the denominational elements with and from the actuators for actuation thereby; a step-by-step counting device; means including a slide to advance the step-by-step counting device; a member connected to the engaging and disengaging means and connectable to the slide; and means operated by the tens transfer means for one denominational element to connect the member to the slide, so that subsequent functioning of the engaging and disengaging means will operate the slide to advance the step-by-step counting device one step to count the number of tens digits transferred from said one denominational element to the adjacent denominational element.

3. In a machine of the class described, having a totalizer comprising an element for each denominational order, and means to transfer tens digits from each of said elements to the next element, the combination of means including an actuator for each denominational element to enter values in said elements; means to engage and disengage the denominational elements with and from the corresponding actuators for actuation thereby; a step-by-step counting device; means including a slide to actuate the step-by-step counting device; a member connected to the engaging and disengaging means and connectable to the slide; means normally effective to retain the member disconnected from the slide; and means operated by the tens transfer means for one denominational element to render the retaining means ineffective to cause the member to be connected to the slide, whereupon subsequent functioning of the engaging and disengaging means will cause the slide to actuate the step-by-step counting device to count the number of tens digits transferred from said one denominational element to the adjacent element.

4. In a machine of the class described, having a totalizer comprising a plurality of denominational wheels and a tens transfer mechanism to transfer tens digits from each denominational wheel to the adjacent wheel, the combination of means including an actuator for each totalizer wheel to enter values therein; means to engage and disengage the totalizer wheels with and from the actuators for actuation thereby; a step-by-step counting device; means including a slide to actuate the counting device, said slide having a projection thereon; a member operatively connected to the engaging and disengaging means and having a shoulder engageable with the projection; a link operatively connected to the tens transfer mechanism for one denominational wheel; and coacting pieces on the link and the member, said pieces normally effective to retain the shoulder out of engagement with the projection, but effective upon operation of the link by the tens transfer mechanism for said one denominational wheel to connect the shoulder to the projection, whereby operation of the engaging and disengaging means causes the step-by-step counting device to be actuated to count the number of tens digits transferred from said one denominational wheel.

5. In a machine of the class described, having a totalizer comprising an element for each denominational order and a tens transfer mechanism for transferring tens digits from each of said elements to the adjacent element, the combination of means including an actuator for each element, to enter values therein; means to engage and disengage the totalizer elements and the actuators for the entering of values in said elements; an increment counting device; means including a slide to actuate the counting device; a projection on the slide; a lever operatively connected to the engaging and disengaging means; a shoulder on the lever engageable with the projection; a link, said link and said lever having similar pieces normally coacting with each other to hold the shoulder out of engagement with the projection; and connections between the link and the tens transfer mechanism for one denominational element, whereby the transferring of a tens digit from said one element will cause the link to move the piece thereon out of coacting relationship with the piece on the member to permit the shoulder to engage the projection so that operation of the member by the engaging and disengaging means will actuate the counting device to count one each time a tens digit is transferred from said one element.

References Cited in the file of this patent

UNITED STATES PATENTS

| | | |
|---|---|---|
| 974,272 | Hollerith | Nov. 1, 1910 |
| 2,127,673 | Christian | Aug. 23, 1938 |